(12) United States Patent
Quast et al.

(10) Patent No.: US 8,606,581 B1
(45) Date of Patent: Dec. 10, 2013

(54) MULTI-PASS SPEECH RECOGNITION

(75) Inventors: Holger Quast, Merelbeke (BE); Marcus Gröber, Gifhorn (DE); Mathias Maria Juliaan De Wachter, Kessel-Lo (BE); Frédéric Elie Ratle, Ghent (BE); Arthi Murugesan, Ghent (BE)

(73) Assignee: Nuance Communications, Inc., Burlington, MA (US)

( * ) Notice: Subject to any disclaimer, the term of this patent is extended or adjusted under 35 U.S.C. 154(b) by 399 days.

(21) Appl. No.: 12/968,080

(22) Filed: Dec. 14, 2010

(51) Int. Cl.
*G10L 15/32* (2013.01)

(52) U.S. Cl.
USPC .......................................... 704/254

(58) Field of Classification Search
USPC ................................. 704/260, 254
See application file for complete search history.

(56) References Cited

U.S. PATENT DOCUMENTS

| | | | |
|---|---|---|---|
| 7,058,573 B1 * | 6/2006 | Murveit et al. ............. | 704/229 |
| 7,184,957 B2 * | 2/2007 | Brookes et al. ............. | 704/246 |
| 7,996,224 B2 * | 8/2011 | Bacchiani et al. ........... | 704/254 |
| 8,041,566 B2 * | 10/2011 | Peters et al. .................. | 704/236 |
| 2011/0004462 A1 * | 1/2011 | Houghton et al. ................ | 704/9 |

* cited by examiner

*Primary Examiner* — Susan McFadden
(74) *Attorney, Agent, or Firm* — Chapin IP Law, LLC

(57) ABSTRACT

According to example configurations, a speech recognition system is configured to receive an utterance. Based on analyzing at least a portion of the utterance using a first speech recognition model on a first pass, the speech recognition system detects that the utterance includes a first group of one or more spoken words. The speech recognition system utilizes the first group of one or more spoken words identified in the utterance as detected on the first pass to locate a given segment of interest in the utterance. The given segment can include one or more that are unrecognizable by the first speech recognition model. Based on analyzing the given segment using a second speech recognition model on a second pass, the speech recognition system detects one or more additional words in the utterance. A natural language understanding module utilizes the detected words to generate a command intended by the utterance.

24 Claims, 14 Drawing Sheets

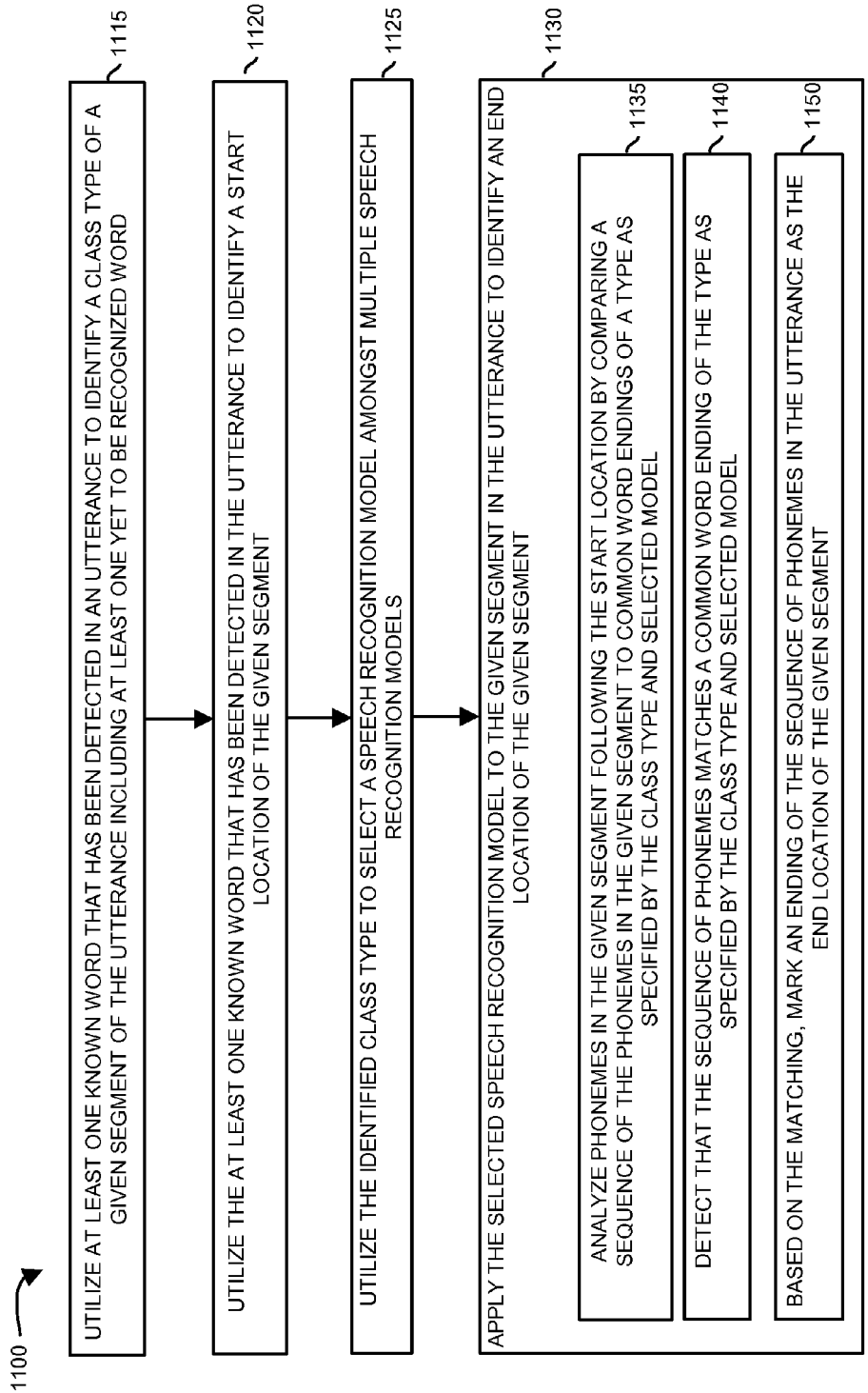

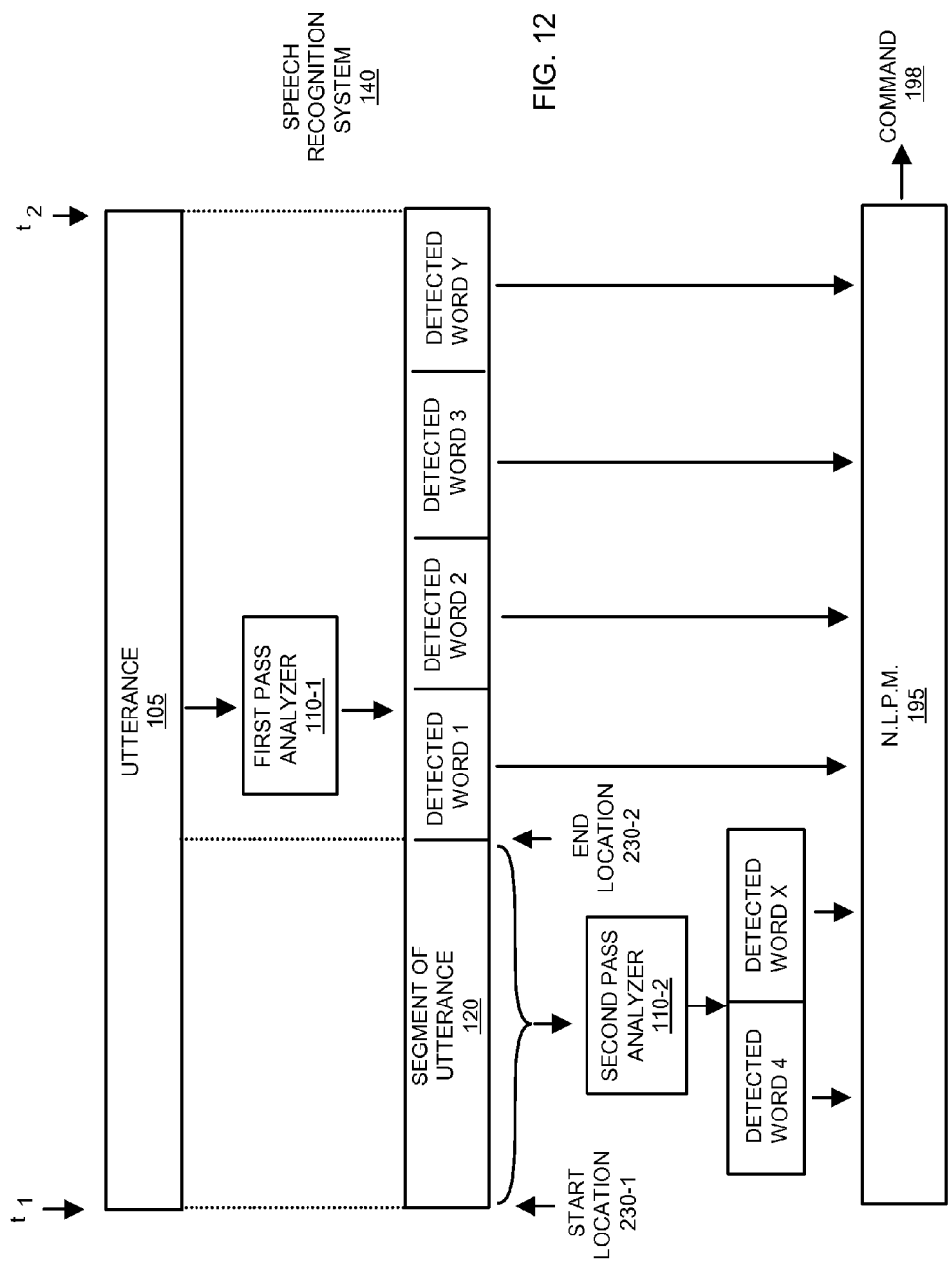

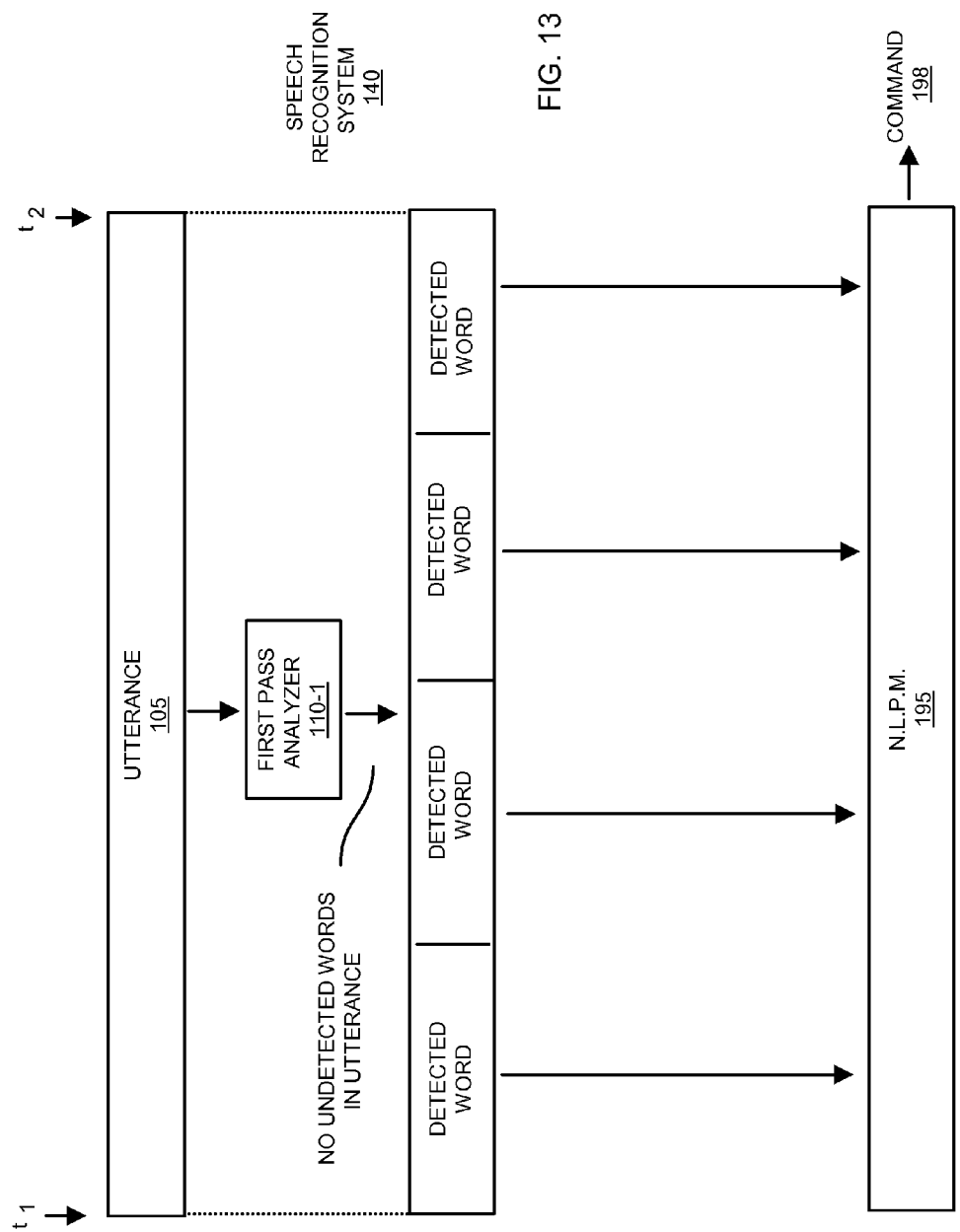

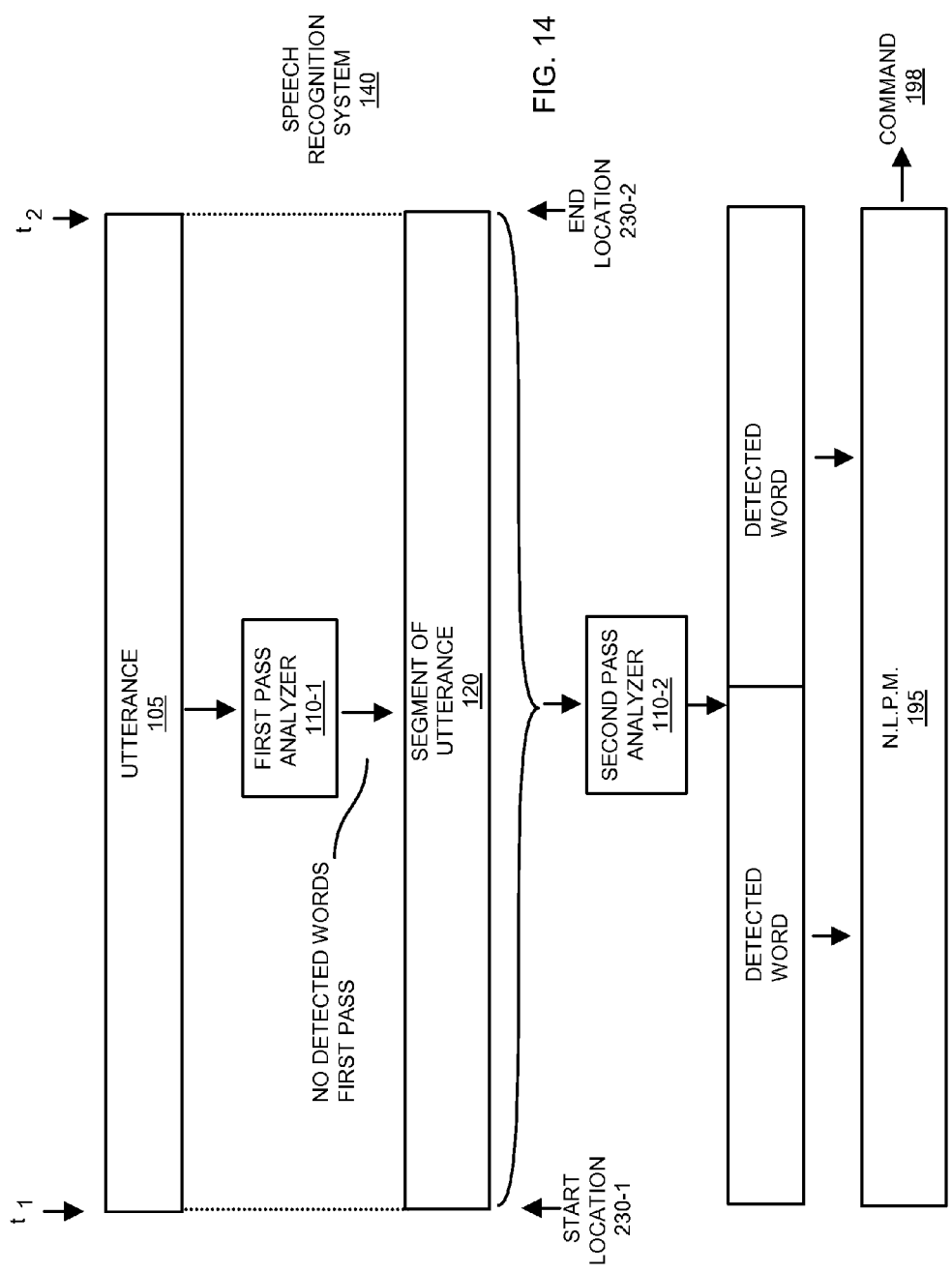

MULTI-PASS SPEECH RECOGNITION

BACKGROUND

Recent developments in computers and corresponding speech recognition software algorithms have made it possible to control equipment via spoken commands. Thus, it is becoming more feasible and common for users to control their computers, electronics, personal devices, etc., via speech input.

Speech recognition systems are highly complex and operate by matching an acoustic signature of an utterance with acoustic signatures of words in a language model. As an example, according to conventional speech recognition systems, a microphone first converts a received acoustic signature of an uttered word into an electrical signal. An A/D (analog-to-digital) converter is typically used to convert the electrical signal into a digital representation. A digital signal processor converts the captured electrical signal from the time domain to the frequency domain.

Generally, as another part of the speech recognition process, the digital signal processor breaks down the utterance into its spectral components. The amplitude or intensity of the digital signal at various frequencies and temporal locations are then compared to a language model to determine the one or more word that were utterance.

Speech recognition systems typically become less effective as the size of a vocabulary to be recognized by the model increases. Accordingly, for language models supporting a large vocabulary, it is more likely that a word will not be properly recognized. In some speech recognition systems, in order to limit complexity of a language model, the vocabulary supported by a respective model can be limited.

BRIEF DESCRIPTION

As discussed above, conventional speech recognition systems suffer from drawbacks. For example, conventional speech recognition typically requires that a language model have the ability to convert a large number of words (e.g., more than 2000 words) or a relatively complex set of words into corresponding text-based terms. Such systems typically require very complex language models and high speed processing capability to appropriately recognize a received audio signal.

Embodiments herein deviate with respect to conventional speech recognition systems. For example, one embodiment herein includes a multi-pass speech analyzer that converts speech into respective text-based terms using a simplified speech recognition system as compared to conventional speech recognition systems.

For example, embodiments herein include a speech recognition system configured to receive an utterance (i.e., speech). Based on analyzing at least a portion of the utterance using a first speech recognition model on a first pass, the speech recognition system detects that the utterance includes a first group of one or more spoken words. The speech recognition system utilizes the first group of one or more spoken words identified in the utterance on the first pass to locate a given segment in the utterance. The given segment can include one or more words that are unrecognizable by the first speech recognition model or words that have not yet been recognized by the first speech recognition model. Based on analyzing the given segment using a second speech recognition model on a second pass, the speech recognition system detects one or more additional words in the utterance. Accordingly a first pass supports recognition of a first group of one or more words in an utterance while a second pass supports recognition of a second group of one or more words in the utterance.

By way of a non-limiting example, the first speech recognition model can be a statistical language model; the second speech recognition model can be a grammar recognition model, statistical language model, etc.

Thus, embodiments herein include implementing multi-pass speech recognition on a received utterance. For example, during a first pass of the multi-pass speech recognition, the speech recognition system applies a first speech recognition model to the utterance to identify or recognize one or more words in the utterance. The identified one or more words can be used to identify a given segment or slot that includes a word that cannot be identified or recognized by the first speech recognition model. During a second pass of the multi-pass speech recognition following the first pass, the speech recognition system applies the second speech recognition model to the given segment in the utterance.

The second speech recognition model can be a selected speech recognition model that is specifically configured to identify a type of one or more words that are most likely present in the given segment. For example, the speech recognition system can be configured to recognize, on the first pass, different possible sequences of words that may be present in an utterance. Each of the different possible sequences of words that may be recognized on the first pass provides an indication of a classification of one or more words in the given segment.

In one embodiment, the speech recognition system as discussed herein assigns or associates a respective speech recognition model to each respective word sequence of multiple possible word sequences; each respective speech recognition model is configured to analyze and recognize words that typically follow the respective word sequence associated with the respective speech recognition model. Thus, in accordance with one embodiment, during operation, the speech recognition system initially matches the one or more spoken words in the utterance as detected on the first pass with a specific word sequence of the multiple possible word sequences. Based on the match, the speech recognition system identifies a type associated with words in the given segment and selects a corresponding speech recognition model that is able to identify presence of words that are of the type that typically follow the identified word sequence in the utterance.

For example, assume that the speech recognition system identifies on the first pass that the utterance include the terms "go to". Based on presence of such a sequence of words, the speech recognition system determines that the given segment likely includes one or more words specifying a "location" word. In this instance, based on a class type being a location, the speech recognition system selects a corresponding speech recognition model (amongst multiple speech recognition models) that is able to identify uttered locations. Accordingly, the first pass according to embodiments herein can include utilizing the first group of identified words to identify a class type to which words in the given segment pertain. Thereafter, on the second pass, the speech recognition system utilizes an appropriate speech recognition model of multiple speech recognition models to identify one or more additional words in the given segment or slot. The appropriate sound recognition model to be used on the second pass depends on the words recognized on the first pass as the words detected on the first pass indicate a likely topic of the words to be recognized in the given segment of time slot. Accordingly, embodiments herein include a second pass of extracting a group of at least one spoken word from the given segment in the utterance.

Note that according to further embodiments, a sequence of words in the utterance under test can provide an indication of a beginning location of the given segment in the utterance. Thus, an initially detected sequence or group of words in the utterance can be used to identify a slot of interest in the utterance including one or more additional specific words.

As previously discussed, the speech recognition system can identify a class type associated with the first group of detected words. For example, the sequence of detected words in the utterance may indicate that the given segment includes one or more words specifying a location, song, etc. The speech recognition system can utilize the class type as identified on the first pass to select a so-called end-of-segment analyzer model amongst multiple end-of-segment analyzer models.

Each end-of-segment analyzer model in the speech recognition system can be a specialized model configured to recognize an end of a corresponding word type. As an example, a first end-of-segment analyzer model can be configured to identify a slot ending or end of a segment of interest in the utterance for location type information in a slot, a second end-of-segment analyzer model can be configured to identify an ending of a word for song type information in a slot, and so on.

More specifically, if the group of words detected on the first pass indicates that a portion of the utterance (e.g., the given segment) includes a word specifying a location, the speech recognition system selects an appropriate model configured to detect an end of word for different possible "location" type words; if the group of words detected on the first pass indicates that a portion of the utterance (e.g., the given segment) includes a word specifying music information, the speech recognition system selects an appropriate model configured to detect an end of word for different possible "music" type words; and so on. Detection of the end of a word can indicate a slot ending or segment ending.

In one embodiment, the speech recognition system applies the selected end-of-segment analyzer model to phonemes in the given segment or slot following the identified start location of a segment or slot of interest. Via application of the selected end-of-segment analyzer model, the speech recognition system identifies the end location of the given segment. Accordingly, subsequent to application of the selected end-of-segment analyzer model to the utterance, the speech recognition system knows the beginning and ending locations of a specific portion of the utterance to be analyzed on the second pass.

As previously discussed, on a second pass, the speech recognition system utilizes the class type as identified on the first pass to select the second speech recognition model to apply to the yet to be recognized words in the given segment.

In accordance with further embodiments, the speech recognition system can include a natural language understanding module to convert the utterance into a respective executable command. In one embodiment, the natural language understanding model receives notification that the utterance includes the group of one or more spoken words in the utterance as detected on the first pass and a group of one or more words in the given segment as detected on the second pass. Via execution of the natural language understanding model, the speech recognition system analyzes a combination of the words identified on the first pass and words identified on the second pass to generate a command intended by the utterance.

As discussed above, techniques herein are well suited for use in software and/or hardware applications implementing speech recognition. However, it should be noted that embodiments herein are not limited to use in such applications and that the techniques discussed herein are well suited for other applications as well.

These and other embodiments are discussed in more detail below.

As mentioned above, note that embodiments herein can include a configuration of one or more computerized devices, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product including a non-transitory computer-readable storage medium on which software instructions are encoded for subsequent execution. The instructions, when executed in a computerized device having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware or microcode in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, one particular embodiment of the present disclosure is directed to a computer program product that includes a computer readable storage medium having instructions stored thereon for speech recognition such as converting of an utterance to corresponding text. For example, in one embodiment, the instructions, when executed by a processor of a respective computer device, cause the processor to: receive an utterance; based on analyzing at least a portion of the utterance using a first speech recognition model, detect that the utterance includes a first group of at least one spoken word; utilize the first group of at least one spoken word in the utterance to locate a given segment in the utterance including a word unknown to the first speech recognition model; and based on analyzing the given segment using a second speech recognition model, detect a second group of at least one spoken word in the utterance.

In accordance with another embodiment, computer readable media can be encoded with instructions, that when executed by a processor of a respective computer device, cause the processor to: utilize at least one known word that has been detected in an utterance to identify a class type of a given segment of the utterance including at least one yet to be recognized word; utilize the identified class type to select a speech recognition model amongst multiple speech recognition models; and apply the selected speech recognition model to the utterance to identify an end location of the given segment including the at least one yet to be recognized word.

The ordering of the steps has been added for clarity sake. These steps can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein can be embodied strictly as a software program, as a hybrid of software and hardware, or as hardware alone such as within a processor, or within an operating system or a within a software application. Example embodiments of the invention may be implemented within products and/or software applications such as those manufactured by Nuance Communications, Inc., Burlington, Mass., USA.

Additionally, although each of the different features, techniques, configurations, etc., herein may be discussed in different places of this disclosure, it is intended that each of the concepts can be executed independently of each other or, where suitable, the concepts can be used in combination with each other. Accordingly, the one or more present inventions as described herein can be embodied and viewed in many different ways.

Also, note that this preliminary discussion of embodiments herein does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), and additional points of novelty, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

FIG. 11 is a flowchart illustrating an example method of implementing an end-of-segment analyzer model in a speech recognition system according to embodiments herein.

FIG. 12 is an example diagram illustrating processing of a received utterance according to embodiments herein.

FIG. 13 is an example diagram illustrating processing of a received utterance according to embodiments herein.

FIG. 14 is an example diagram illustrating processing of a received utterance according to embodiments herein.

DETAILED DESCRIPTION

Current Natural Language Understanding (NLU) applications such as those used in automotive applications suffer from the drawback that their embedded computational platforms, in practice, cannot support SLMs (Statistical Language Models) with word categories greater than 2000 entries. Accordingly, an example utterance such as "I want to go to Philipsburg, please" cannot be modeled with an SLM city slot having more than 2000 words. Conventional grammar-based recognition, which could handle a so-called large "city" slot in the phrase, is not flexible enough to support NLU. Conventional multi-pass phoneme sequence matching techniques are slow and, in some cases, inaccurate.

Certain embodiments herein include slot recognition and slot processing. For example, an SLM type slot can be modeled by a slot-content, data-specific, any-speech summary model. The slot model can be trained on the data it needs to represent. In the context of the example above, a "city" slot model can be trained on a group of city names available in an automotive navigation application. The slot model learns the a-priori and transition statistics of the slot constituents. These slot constituents can be so-called sub-word units on the verbal or phonetic level, such as syllables or triphones.

As discussed herein, in a first recognition pass of multiple passes, the SLM with the summary city slot model can then recognize a portion of an example utterance. In the above example, based on analyzing on the first pass, the first recognition pass identifies that the uttered phrase indicates "I want to go to <location>, please", establishing that the uttered phrase includes a slot and that the slot includes one or more yet to be recognized location type words. The result of this first step may be sufficient input for an NLU to identify the topic (e.g., enter_destination) of the utterance.

A second pass of a recognition process can include applying a dedicated slot recognizer such as a grammar recognition system to content in the slot (e.g., segment of utterance 120) identified in the first pass. The slot may reside at any location in the utterance. Depending on how the slot analyzer is modeled, this can mean either starting recognizing at signal level again, or already at a higher level, such as by matching of sub-word units such as phonemes, syllables, etc.

Figure 1:
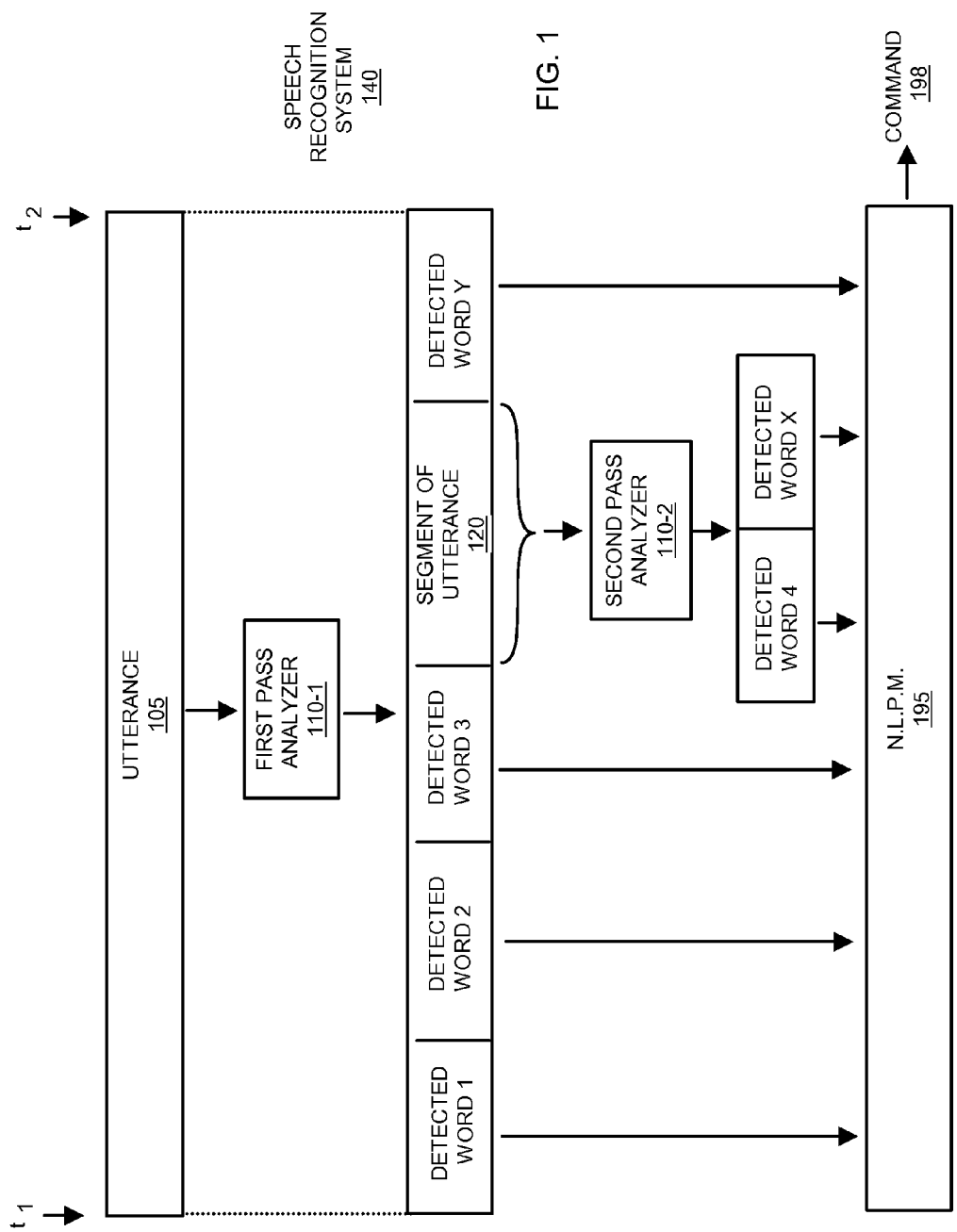
FIG. 1 is an example diagram of a multi-pass speech recognition system according to embodiments herein.

Now, referring to the figures, FIG. 1 is an example diagram illustrating a speech recognition system according to embodiments herein. In general, the speech recognition system 140 supports a multi-pass speech analysis facilitating conversion of speech (i.e., an utterance 105) into respective text-based terms. A natural language processing module 195 converts the recognized sequence of words in the utterance 105 into a respective command 198.

More specifically, as shown, speech recognition system 140 includes a first pass analyzer 110-1 and a second pass analyzer 110-2. In general, the first pass analyzer 110-1 receives utterance 105, which includes words spoken between time $t_1$ and time $t_2$. The utterance 105 can be an analog and/or digital signal representing speech produced by a source such as a human.

In accordance with embodiments herein, the first pass analyzer 110-1 of the recognition system 140 analyzes the utterance 105 and recognizes that utterance 105 includes at least WORD 1, WORD 2, and WORD 3. Note in this example that there are multiple words preceding the segment of utterance 120 as shown in FIG. 1. Note that this is shown by way of non-limiting example only and that the segment of utterance 120 may be located anywhere within the utterance 105 between time t1 and time t2.

In the example of FIG. 1, analysis of the utterance 105 can include, starting at time t1, applying speech recognition to the utterance 105 to identify words such as WORD 1, WORD 2, and WORD 3.

Assume in this example that the first pass analyzer 110-1 is unable to identify the one or more words encoded in the segment of utterance 120 because a respective language model applied by the first pass analyzer 110-1 is not capable of recognition or one or more words in the segment of utterance 120.

The second pass analyzer 110-2 analyzes segment of utterance 120. The second pass analyzer 110-2 can be one of multiple language analyzers configured to identify a specific type of one or more words that are likely in the segment of utterance 120. Each language analyzer can be used to detect different topics of words.

In one embodiment, the segment of utterance 120 resides in a slot identified by other detected words in the utterance 105. The topic of a word or words in the slot (i.e., segment of utterance 120) can be one of multiple types as mentioned above. The detected words on the first pass can indicate or provide a clue as to the topic type or type of words in the slot (i.e., segment of utterance 120).

In the present example, the second pass analyzer 110-2 analyzes the segment of utterance 120 and detects that the segment of utterance 120 includes an utterance of WORD 4 and WORD X.

Thus, according to embodiments herein, the first pass analyzer 110-1 analyzes at least a portion of the utterance 105 and identifies that the utterance 105 includes a first group of one or more spoken words residing at any location (e.g., beginning, middle, end) of the utterance 105. As discussed in subsequent portions of this disclosure, the speech recognition system 140 can utilize the first group of zero or more spoken words identified in the utterance 105 on the first pass to locate the segment of utterance 120. As previously mentioned, the segment of utterance 120 can include zero or more words that have not yet been recognized by the first pass analyzer 110-1.

In one embodiment, the segment of utterance 120 or slot includes zero or more words in the utterance residing in a location of the utterance 120 preceding the segment of utterance 120. Note again that the content in the segment of utterance 120 may not be recognizable by the first pass analyzer 110-1. However, the one or more spoken words in the segment of utterance 120 may be recognizable by the second pass analyzer 110-2.

As previously discussed, in accordance with further embodiments, note that speech recognition system 140 in FIG. 1 can include a natural language processing module 195 to convert the utterance into a respective executable command 198. The command 198 can be used to control electronic devices such as navigation systems, radio devices, media players, phones, etc., in an environment such as an automobile.

To generate the command 198, the natural language processing model receives notification that the utterance 105 includes i) the group of zero or more spoken words (e.g., WORD 1, WORD 2, WORD 3 and WORD Y) in the utterance 105 as detected by the first pass speech analyzer 110-1 on the first pass and ii) a group of zero or more words (e.g., WORD 4 and WORD Y) in the segment of utterance 120 as detected by the second pass analyzer 110-2 on the second pass. Via application of a natural language processing module 195, the speech recognition system 140 analyzes a combination of the words identified on the first pass and words identified on the second pass to identify the command corresponding to the utterance 105.

Figure 2:
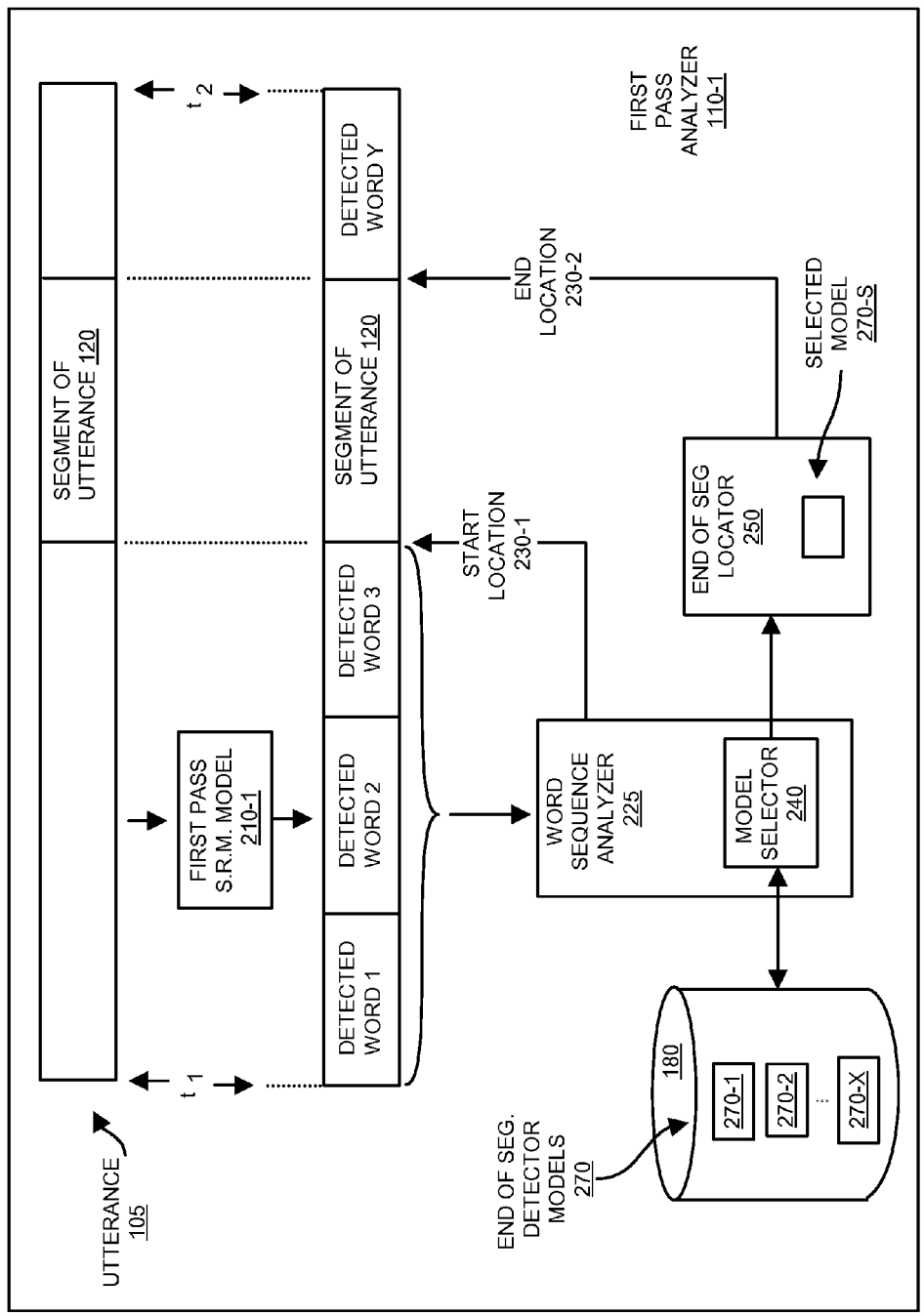
FIG. 2 is an example diagram illustrating a first pass analyzer module of a speech recognition system according to embodiments herein.

FIG. 2 is an example diagram illustrating more specific details of first pass analyzer 110-1 according to embodiments herein. As discussed above, the segment of utterance 120 or slot can reside at any position in the utterance 105. On the first pass, detected words (preceding or following the segment of utterance 120) in the utterance 105 can indicate a location of the slot or the segment of utterance 120. As shown, first pass analyzer 110-1 includes a first pass speech recognition model 210-1, a word sequence analyzer 225, repository 180, a model selector 240, and an end-of-segment locator 250.

During operation, the first pass analyzer 110-1 applies first pass speech recognition model 210-1 to at least a portion of utterance 105.

By way of a non-limiting example, the first pass speech recognition model 110-1 can be a statistical language model configured to detect constituent words such as "to", "on", "off", "the", etc., that typically appear in different spoken command phrases. Example command phrases to control functionality in a user environment can include utterances such as " . . . turn on the radio", "change the radio station to . . . ", " . . . go to Boston", "please play . . . on the CD player", etc., that are spoken by a user to perform a corresponding command associated with a command phrase. The constituent words represent words that are commonly present in different types of commands and, thus, are not necessarily unique to any particular type of command.

In the present example, starting from time $t_1$, the first pass speech recognition model 210-1 analyzes utterance 105 and recognizes a presence of constituent words such as WORD 1, WORD 2, WORD 3, in utterance 105.

The first pass analyzer 110-1 can be configured to include word sequence analyzer 225. In such an embodiment, the word sequence analyzer 225 analyzes the sequence of detected words such as detected WORD 1, WORD 2, and WORD 3 to identify a start location 230-1 associated with segment of utterance 120. Segment of utterance 120 includes one or more unique words that will be recognized by a language model other than the first pass speech recognition model 210-1 as discussed below.

In one embodiment, the word sequence analyzer 225 has access to a set of pre-stored common word combinations that are typically spoken by a user to carry a corresponding type of command. Each of the different possible sequences of words can provide an indication of a classification of one or more words in the segment of utterance 120. For example, a first set of constituent words detected in the utterance 105 on the first pass can indicate that an identified slot (e.g., segment of utterance 120) of the utterance 105 includes one or more words of a first topic; a second set of constituent words detected in the utterance 105 on the first pass can indicate that an identified slot (e.g., segment of utterance 120) of the utterance 105 includes one or more words of a second topic; a third set of constituent words detected in the utterance 105 on the first pass can indicate that an identified slot (e.g., segment of utterance 120) of the utterance 105 includes one or more words of a third topic, and so on. Thus, detection of one or more words in the utterance 105 on the first pass can indicate a location of a slot of interest in the utterance 105 as well as a likely topic of the one or more words in the identified slot.

As discussed herein, depending on a likely topic of words in the identified slot, the speech recognition system 140 selects an appropriate speech analyzer on the second pass to convert the one or more words in the slot (i.e., segment of utterance 120). In one embodiment, the set of recognizable speech information in the slot can be topic information such as enter_destination, open_radio_menu, set_airco, etc. A different second pass analyzer is used to recognize the speech information in the slot depending on the topic type.

As an example, the utterance "go to Burlington" can yield topic: enter_destination, slot: location, and slot value: Burlington. Then the application can carry out the command associated with these information items. In this example, the first pass analyzer 110-1 would recognize the phrase: I want to go to <location> please. Based on detected words on the first pass, the slot topic in this example is a geographical location. The speech recognition system 140 selects a specific second pass analyzer configured to detect the geographical information in the identified slot.

On the second pass, embodiments herein include applying the appropriate second pass analyzer 110-2 (e.g., a secondary recognizer) selected from multiple possible second pass analyzers to the interval or slot (i.e., segment of utterance 120) where it is assumed that the slot includes geographical or location type content.

In accordance with more specific embodiments, the speech recognition system 140 can be a natural language understanding system (e.g., NLU system). The NLU system evaluates the utterance 105 and identifies which of the multiple possible topics the information in the slot most likely belongs.

In one embodiment, the set of recognizable topics could be: enter_destination(destination: X), open_radio_menu, set_airco(temperature: X), etc.

The example utterance "I want to go to Burlington" would trigger the first example topic, enter_destination. To complete translation of the request captures by utterance 105, the speech recognition system 140 selects an appropriate second pass analyzer 110-2 to recognize geographical information such as the destination to which the user would like to drive. This geographical information resides in the slot of segment of utterance 120. In this example, the slot would be a destination in enter_destination(destination: X).

Thus, based on an analysis performed on the first pass, the speech recognition system 140 knows that the slot destination can be filled with values of the type <location>, possibly also with more specific values of the type <city> or <street>. Via the second pass analyzer 110-2, the speech recognition system 140 extracts, in the following pass, the information that "Burlington" was said where the first pass just detects the <location> spaceholder. The word "Burlington" is thus the slot value needed to convert the utterance 105 into a respective executable command.

So after all passes have been completed, the NLU system would output topic="enter_destination" and slot value="Burlington". The natural language processing model 195 then converts the detected words in the utterance 105 into the appropriate command 198 for execution.

Note that the segment of utterance 120 can be enlarged to ensure that the content therein can be analyzed. For example, the segment of utterance 120 can include extra margin before the segment of utterance interval and even more margin after the interval to be sure that this part actually contains the location word(s). The output of that second pass analyzer 110-2 would then be "Burlington." Based on a comparison of the detected sequence of words in utterance 105 (e.g., WORD 1, WORD 2, and WORD 3) to the different possible word sequences, the word sequence analyzer 225 is able to identify start location 230-1, indicating a relative time in utterance 105 including one or more class specific words that make the command unique over other commands.

As an example, assume that WORD 2 is identified as the word "go" and that WORD 3 is identified as the word "to". In such an instance, the word sequence analyzer 225 analyzes the sequence of detected words (e.g., go to) and, based on detecting that the sequence most likely matches a pre-known sequence for a respective type of command or topic, deduces that a portion of the utterance 105 (e.g., segment of utterance 120) following the end of WORD 3 needs to be analyzed via a specialized language model to recognize words therein.

Matching can be based on a statistical process in which n-grams are analyzed to determine how likely they are. For instance, bi-grams "I—want" or "want—to" are very likely, a bigram "want—want" is not statistically likely. Based on these accumulated n-gram probabilities, embodiments herein can include recognizing whether the sentence hypothesis is likely or not.

In the present example, the word sequence analyzer 225 would deduce that the detected sequence of the words "go to" in the utterance 105 indicates that unique location information is likely present in the utterance 105 and that the location resides in a slot or segment following start location 230-1.

As another example, assume that WORD 3 is identified as the word "to" and that WORD 3 is identified as the word "play". In this instance, the word sequence analyzer 225 would deduce that the detected sequence of "to play" in the utterance 105 indicates that unique song or music type information is likely present in the slot or segment utterance 105 following start location 230-1. In such an instance, instead of selecting and applying a second pass analyzer 110-2 configured to detect geographical types of words in an identified slot as discussed in the above example, the speech recognition system 140 selects a second pass analyzer capable of detecting song or music type information in the segment of interest 120. Thus, depending on detected words in the utterance 105 on the first pass, the speech recognition system 140 selects and applies an appropriate one of multiple analyzers on the second pass to recognize a spoken command.

Accordingly, based on analyzing the sequence of detected words in utterance 105, the word sequence analyzer 225 can identify a start location 230-1 of a respective slot (e.g., segment of utterance 120) in utterance 105 including a specific one or more words associated with an uttered command.

Figure 3:
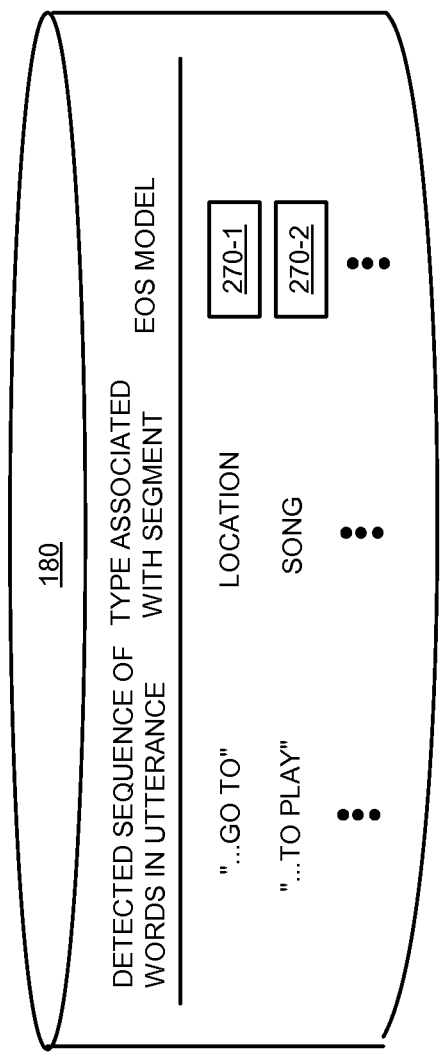
FIG. 3 is an example diagram illustrating mapping of sequences to respective end-of-segment models according to embodiments herein.

As shown in FIG. 3, the speech recognition system 140 as discussed herein can assign an end-of-segment analyzer models 270-1 to each respective word sequence or multiple possible word sequences that are used to carry out a specific type of command.

As discussed in more detail below, each end-of-segment analyzer model 270 in repository 180 is used to analyze the utterance 105 following the start location 230-1 and identify a likely end location 230-2 of the segment of utterance 120 including the highly specific words in the uttered command.

Referring again to FIG. 2, if the word sequence analyzer 225 identifies that the portion of the utterance 105 on the first pass includes the word sequence "go to", the word sequence analyzer identifies that the segment of utterance 120 likely includes location information. In such an instance, the word sequence analyzer 225 notifies model selector 240 to select end-of-segment analyzer model 270-1 as selected model 270-S (because model 270-1 is configured to identify ending of location type words) to identify end location 230-2 of segment of utterance 120.

Based on selection of the selected end-of-segment analyzer model 270-S (in this instance, selection of model 270-1 since the segment likely includes a location type word), the end-of-segment locator 250 analyzes the utterance 105 following the start location 230-1 to identify a likely ending location of the segment based on comparing the sub-word units in utterance 105 following the start location 230-1 to a pre-known set of word endings or sounds (in model 270-1) that commonly appear in location information.

As an example, the model 270-1 can be trained to detect occurrences of spoken location type of word endings such as -ville, -city, -ton, -land, burg, etc. Detection of any of these sounds in the utterance 105 following the start location 230-1 likely indicates a relevant end location 230-2 of the words in the segment of utterance 120. Accordingly, based on application of model 270-1, the end-of-segment locator 250 marks the end location 230-2 of segment of utterance 120 based on detected endings of words present in the utterance 105 following start location 230-1.

In accordance with another embodiment, assume that the word sequence analyzer 225 identifies that the portion of the utterance 105 on the first pass includes the sequence of words "to play". In response to detecting this sequence of words, the word sequence analyzer identifies that the segment of utterance 120 likely includes song or music information. In such an instance, the word sequence analyzer 225 notifies model selector 240 to select end-of-segment analyzer model 270-2 to identify end location 230-2 of segment of utterance 120.

Based on selection of the selected end-of-segment analyzer model 270-S (in this instance, selection of model 270-2 since the segment likely includes a song or music type word), the end-of-segment locator 250 analyzes the utterance 105 following the start location 230-1 to identify a likely ending of the segment based on comparing the sub-word units in utterance 105 following the start location 230-1 to a pre-known set of word endings or sounds that commonly appear in song, artist, music, rock band, etc., type of information. As an example, the model 270-1 can be trained to detect occurrences of spoken artist type of word endings such as artists' names including Dillon, Petty, band, etc. Detection of any of these sounds in the utterance 105 following the start location 230-1 likely indicates a relevant end location 230-2 of the words of interest in the segment of utterance 120. Accordingly, based on application of model 270-2, the end-of-segment locator 250 marks the end location 230-2 of the segment of utterance 120 based on detected endings of words present in the utterance 105 following start location 230-1.

Subsequent to detecting the end location 230-2 for the segment of utterance 120, the first pass speech recognition model 210-1 can be applied to utterance 105 following the end location 230-2 to identify other words such as WORD Y in the utterance 105.

Figure 4:
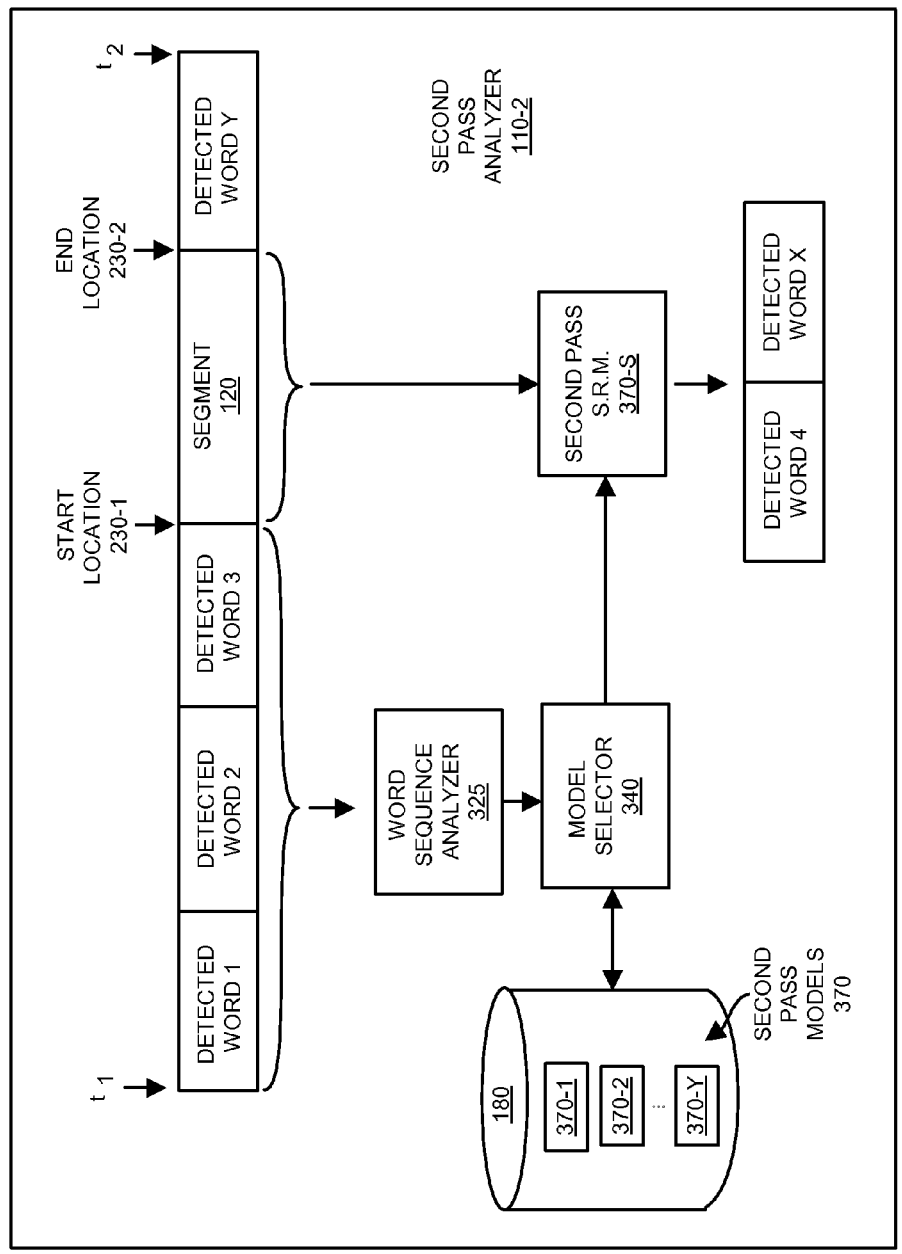
FIG. 4 is an example diagram illustrating a second pass analyzer module of a speech recognition system according to embodiments herein.

FIG. 4 is an example diagram illustrating more details of second pass analyzer 110-2 according to embodiments herein.

As shown, the second pass analyzer 110-2 includes word sequence analyzer 325, model selector 340, repository 180, second pass models 370, and second pass speech recognition model 370-S.

In one embodiment, the word sequence analyzer 325 analyzes the sequence of detected words (e.g., WORD 1, WORD 2, and WORD 3) in utterance 105 to determine a particular one of multiple models to perform second pass speech recognition.

Figure 5:
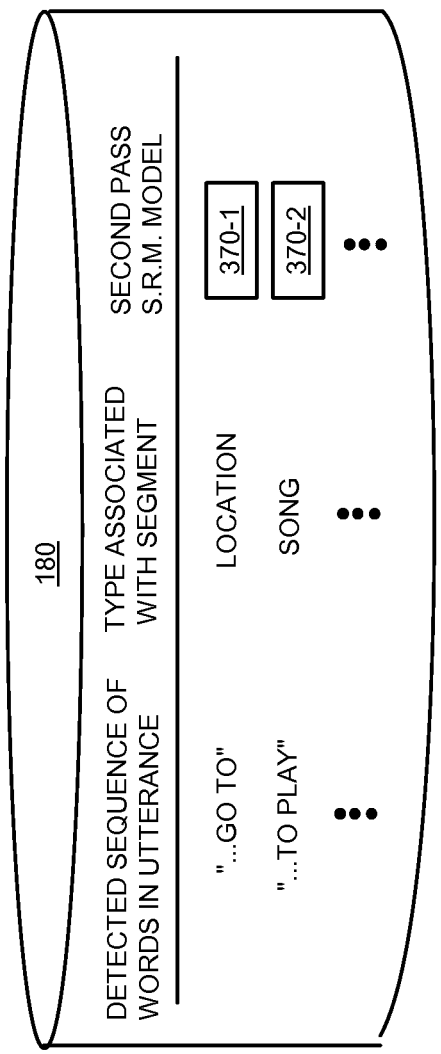
FIG. 5 is an example diagram illustrating multiple second pass models for selection and application to a segment or slot of a received utterance according to embodiments herein.

For example, assume that the word sequence analyzer 325 identifies that the utterance 105 includes the terms "go to" based on application of the first pass speech recognition model. Based on such a sequence of words, the word sequence analyzer 325 determines that the segment of utterance 120 likely includes one or more words specifying a "location." The word sequence analyzer 325 maps the detected sequence of words to the type (i.e., "location") and/ or model (i.e., second pass speech recognition model 370-1, in this example) in FIG. 5. Subsequent to identifying "location" as a type and selecting the second pass speech recognition model 370-1, the word sequence analyzer 325 (in FIG. 4) notifies the model selector 340 to select model 370-1 for application to the segment of utterance 120.

Thus, in this instance, based on a class type of the segment of utterance 120 or slot being a location, the model selector 340 selects second pass speech recognition model 370-1 to identify the yet to be recognized location words in segment of utterance 120. In one embodiment, the second pass speech recognition model 370-S selected for recognizing the one or more words in the utterance 105 is a so-called grammar recognition model that is trained to detect spoken words specifying locations. In other words, the second pass speech recognition model 370-1 is specifically trained with common types of location words that may be in the utterance 105.

Thus, in summary, embodiments herein include implementing multi-pass speech recognition on a received utterance 105. For example, during a first pass of the multi-pass speech recognition, the speech recognition system 100 applies the first pass speech recognition model 210-1 to the utterance 105 to identify one or more words in the utterance 105. The identified one or more words can be used to identify a whereabouts of the segment of utterance 120 or slot in the utterance 105 including a word that cannot be identified by the first pass speech recognition model 270. During a second pass of the multi-pass speech recognition following the first pass, the speech recognition system 140 applies the second pass speech recognition model 370 to the segment of utterance 120. As previously discussed, the second speech recognition model can be a selected speech recognition model that is specifically configured to efficiently identify a type of one or more words that are most likely present in the segment.

The speech recognition system 140 as discussed herein is useful over conventional techniques. For example, the speech recognition system 140 is implemented using multiple relatively simple language models (e.g., a statistical language model and multiple specialized grammar recognition models) as opposed to a single highly complex language model capable of recognizing every possible word in utterance 105.

Note that the embodiments as discussed herein can be modified in a suitable manner to achieve the same end. For example, another approach to converting a received utterance 105 into a respective command 199 can include applying a first model (such as a statistical language model) to the utterance to detect a presence of a group of one or more words. A natural language understanding processor then analyzes the detected words to make sense of the detected words in utterance 105. Some of the words in the utterance 105 may be unrecognizable by the first model. In accordance with such an embodiment, the natural language understanding processor identifies the slot of interest and a respective topic associated with the utterance 105 based on the words in the utterance as identified by the first model. Based on the topic of the utterance, the natural language understanding processor selects a particular language model (e.g., a grammar recognition model) suited for recognizing one or more words in the identified segment or slot of the utterance 105.

Figure 6:
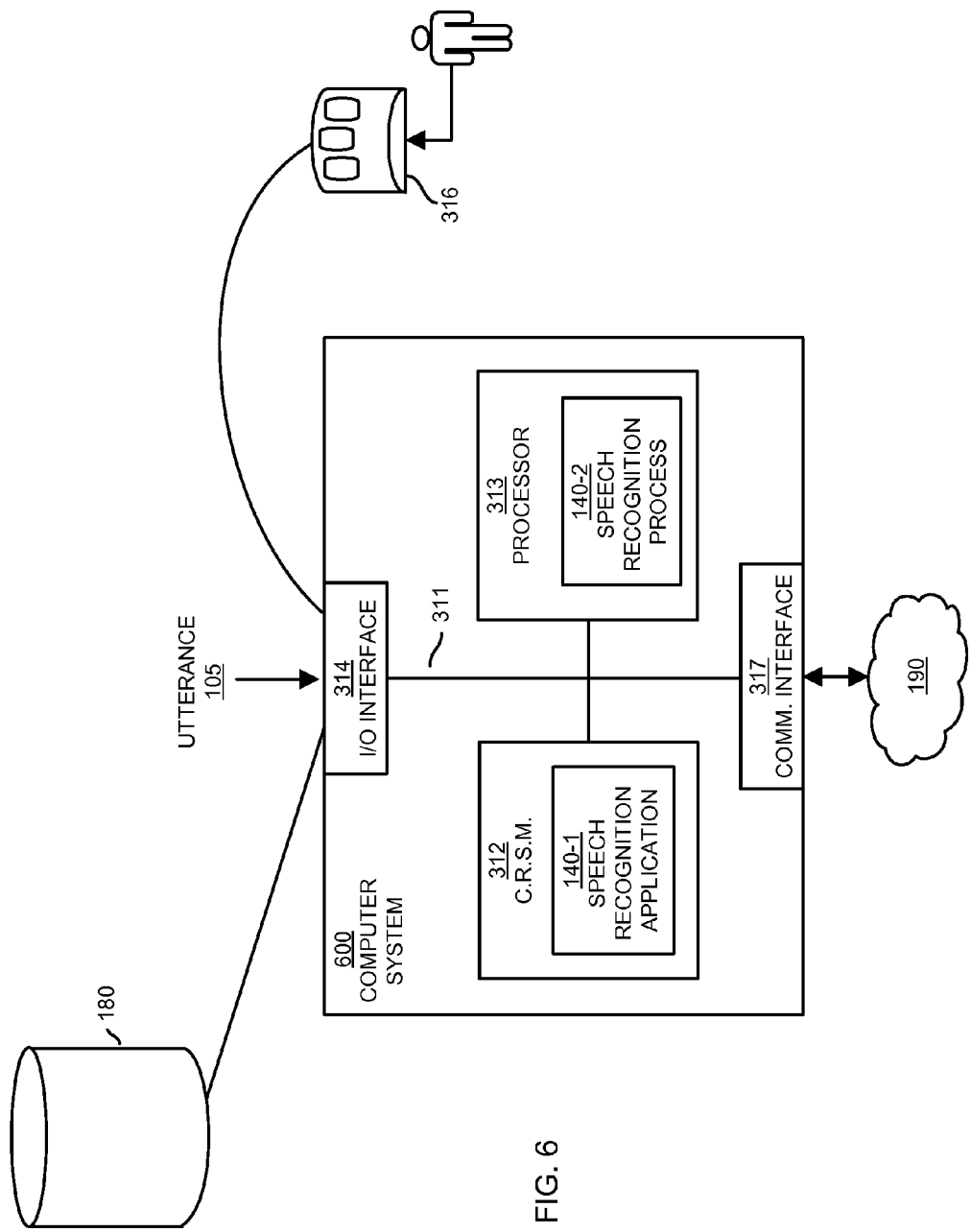
FIG. 6 is a diagram illustrating an example computer architecture for executing a speech recognition system according to embodiments herein.

FIG. 6 is an example block diagram of a computer system for implementing speech recognition system 140 according to embodiments herein.

Computer system 600 can include one or more computerized devices such as a personal computer, workstation, portable computing device, console, network terminal, processing device, network device, etc., operating as a server, client, etc.

Note that the following discussion provides a basic embodiment indicating how to execute a speech recognition system 140 according to embodiments herein. However, it should be noted that the actual configuration for carrying out the operations as described herein can vary depending on a respective application.

As shown, computer system 600 of the present example includes an interconnect 311 that couples computer readable storage media 312 such as a non-transitory type of media in which digital information can be stored and retrieved, a processor 313, I/O interface 314, and a communications interface 317.

I/O interface 314 receives utterance 105. I/O interface 314 provides connectivity to repository 180 and, if present, other devices such as display screen, peripheral devices 316, keyboard, computer mouse, etc.

Computer readable storage medium 312 can be any suitable device such as memory, optical storage, hard drive, floppy disk, etc. In one embodiment, the computer readable storage medium 312 is a non-transitory storage media to store instructions and/or data.

Communications interface 317 enables the computer system 600 and processor 313 to communicate over a network 190 to retrieve information from remote sources and communicate with other computers. I/O interface 314 enables processor 313 to retrieve or attempt retrieval of stored information such as models, etc., from repository 180.

As shown, computer readable storage media 312 can be encoded with speech recognition application 140-1 (e.g., software, firmware, etc.) executed by processor 313.

During operation of one embodiment, processor 313 accesses computer readable storage media 312 via the use of interconnect 311 in order to launch, run, execute, interpret or otherwise perform the instructions of speech recognition application 140-1 stored on computer readable storage medium 312. Speech recognition application 140-1 can include appropriate instructions, language models, analyzers, etc., to carry out any or all functionality (e.g., first pass analyzer 110-1, second pass analyzer 110-2, word sequence analyzer 225, word sequence analyzer 325, model selector 240, mapping, etc.) associated with the speech recognition system 140 as discussed herein.

Execution of the speech recognition application 140-1 produces processing functionality such as speech recognition process 140-2 in processor 313. In other words, the speech recognition process 140-2 associated with processor 313 represents one or more aspects of executing speech recognition application 140-1 within or upon the processor 313 in the computer system 600.

Those skilled in the art will understand that the computer system 600 can include other processes and/or software and hardware components, such as an operating system that controls allocation and use of hardware resources to execute speech recognition application 140-1.

In accordance with different embodiments, note that computer system may be any of various types of devices, including, but not limited to, a personal computer system, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device. The computer system 600 may reside in an automobile in which a respective occupant of the automobile produces utterance 105 to control functionality of the automobile such as the navigation system, radio, phone, etc.

Functionality supported by resources speech recognition system 140 will now be discussed via flowcharts in FIGS. 7-11. As discussed above, the speech recognition system 140 can be configured to execute the steps in the flowcharts as discussed below.

Note that there will be some overlap with respect to concepts discussed above for FIGS. 1 through 6. Also, note that the steps in the below flowcharts need not always be executed in the order shown. That is, the steps can be executed in any suitable order.

Figure 7:
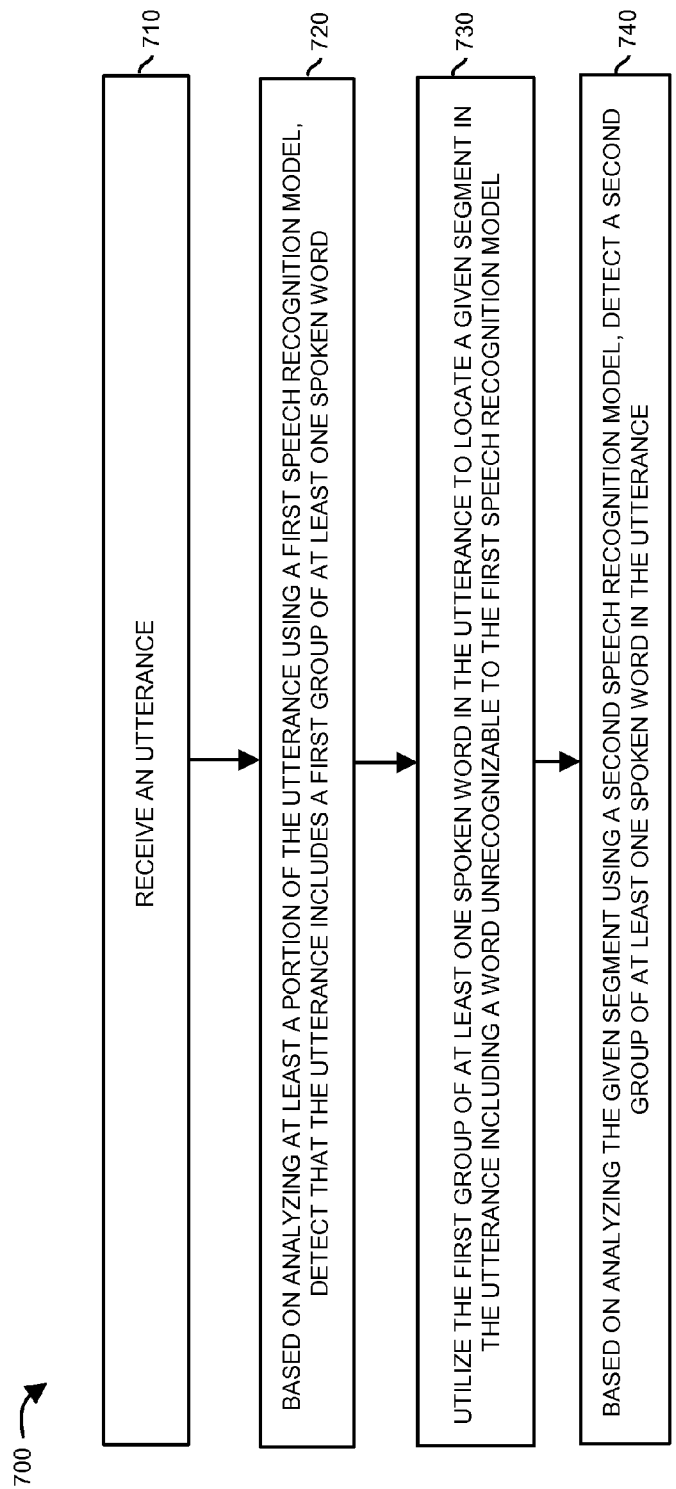
FIG. 7 is a flowchart illustrating an example method of implementing a speech recognition system according to embodiments herein.

FIG. 7 is a flowchart 700 illustrating a general technique of implementing speech recognition according to embodiments herein.

In step 710, the speech recognition system 140 receives an utterance 105.

In step 720, based on analyzing at least a portion of the utterance 105 using a first speech recognition model such as first pass speech recognition model 210-1, the speech recognition system 140 detects that the utterance 105 includes a first group of at least one spoken word (e.g., WORD 1, WORD 2, WORD 3).

In step 730, the speech recognition system 140 utilizes the first group of at least one spoken word in the utterance 105 to locate a given segment or slot such as segment of utterance 120 including a word unrecognizable to the first speech recognition model.

In step 740, based on analyzing the given segment using a second speech recognition model such as second pass speech recognition model 370, the speech recognition system 140 detects a second group of at least one spoken word in the utterance 105.

Figure 8:
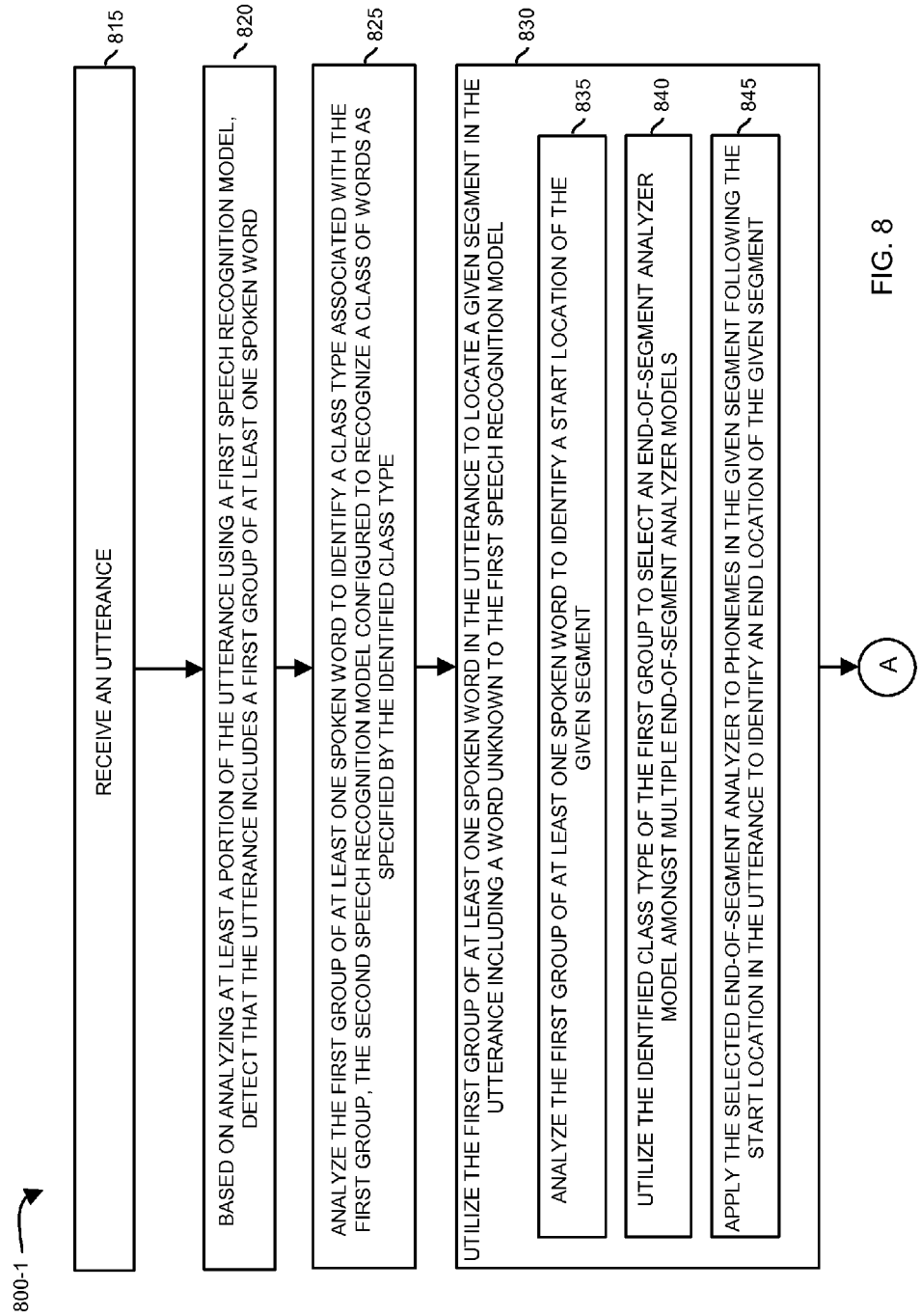
FIGS. 8 and 9 combine to form a flowchart illustrating an example method of implementing a speech recognition system according to embodiments herein.
Figure 9:
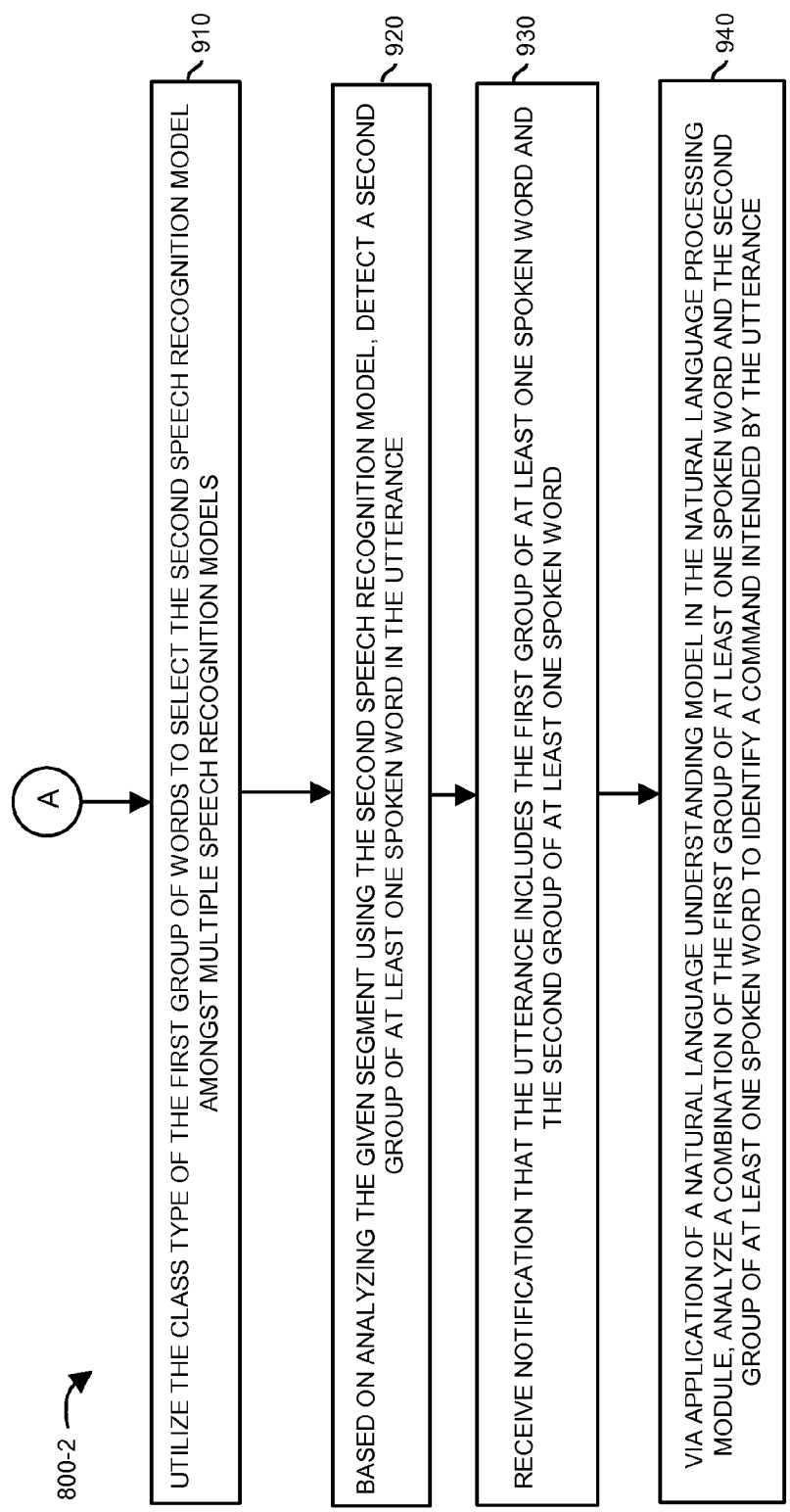

FIGS. 8 and 9 combine to form a flowchart 800 (e.g., flowchart 800-1 and flowchart 800-2) illustrating implementation of a speech recognition system 140 according to embodiments herein.

In step 815, the speech recognition system 140 receives an utterance 105.

In step 820, based on analyzing at least a portion of the utterance 105 using a first speech recognition model such as first pass speech recognition model 210-1, the speech recognition system 140 detects that the utterance 105 includes a first group of at least one spoken word.

In step 825, the speech recognition system 140 analyzes the first group of at least one spoken word to identify a class type associated with the first group. The second speech recognition model can be configured to recognize a class of words as specified by the identified class type.

In step 830, the speech recognition system 140 utilize the first group of at least one spoken word in the utterance to locate a given segment such as segment of utterance 120 including a word unknown or unrecognizable to the first speech recognition model.

In step 835, the speech recognition system 140 analyzes the first group of at least one spoken word to identify a start location 230-1 of the segment of utterance 120.

In step 840, the speech recognition system 140 utilizes the identified class type of the first group to select an end-of-segment analyzer model 270-S amongst multiple end-of-segment analyzer models 270.

In step 845, the speech recognition system 140 applies the selected end-of-segment analyzer 270-S to sub-word units in the segment of utterance 120 following the start location 230-1 in the utterance 105 to identify an end location 230-2 of the segment of utterance 120.

In step 910 of flowchart 800-2 in FIG. 9, the speech recognition system 140 utilizes the class type of the first group of words to select the second pass speech recognition model 370-S amongst multiple speech recognition models 370.

In step 920, based on analyzing the segment of utterance 120 using the second pass speech recognition model 370-S, the speech recognition system 140 detects a second group of at least one spoken word in the utterance.

In step 930, the speech recognition system 140 receives notification that the utterance 105 includes the first group of at least one spoken word and the second group of at least one spoken word.

In step 940, via application of a natural language understanding model in the natural language processing module 195, the speech recognition system 140 analyzes a combination of the first group of at least one spoken word and the second group of at least one spoken word to identify a command 198 intended by the source (e.g., person, machine, etc.) producing the utterance 105.

Figure 10:
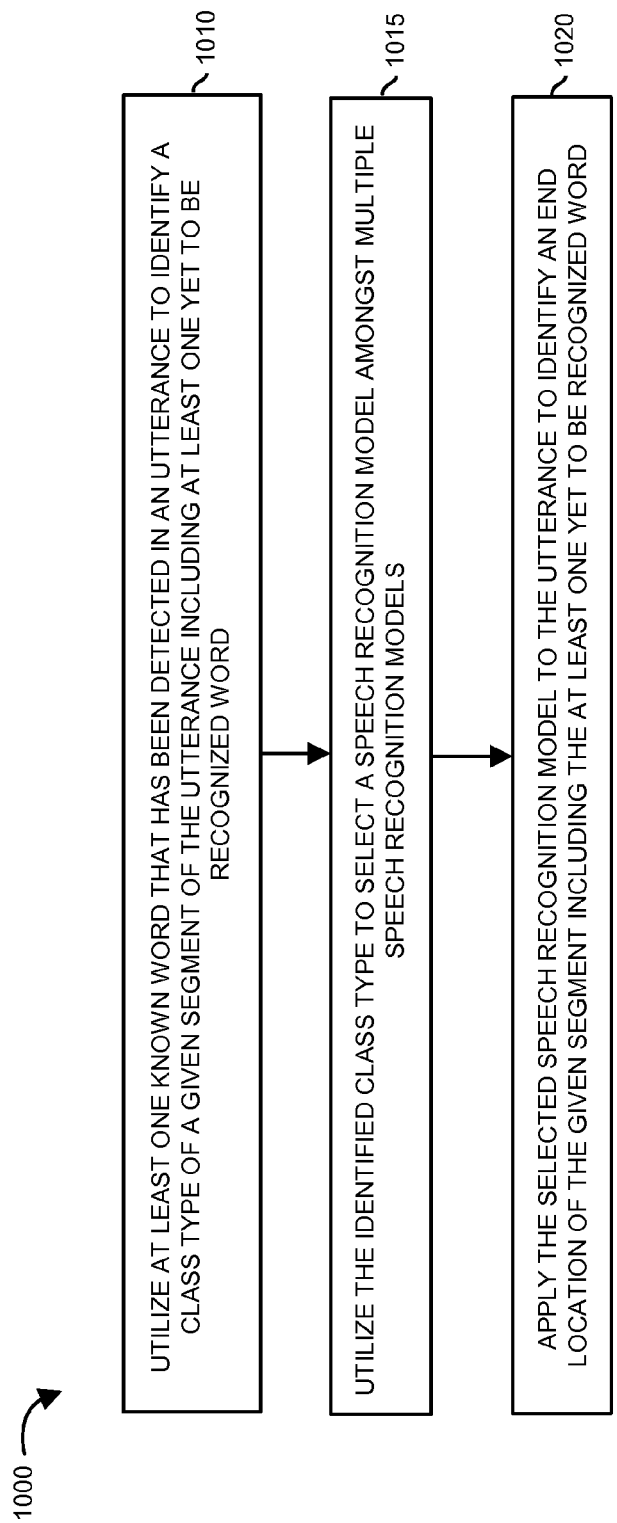
FIG. 10 is a flowchart illustrating an example method of implementing an end-of-segment analyzer model in a speech recognition system according to embodiments herein.

FIG. 10 is a flowchart 1000 illustrating a general method of determining an end location 230-2 of the segment of utterance 120 according to embodiments herein.

In step 1010, the speech recognition system 140 utilizes at least one known word that has been detected in the utterance 105 to identify a class type of a segment of utterance 120 including at least one yet to be recognized word.

In step 1015, the speech recognition system 140 utilizes the identified class type to select a speech recognition model 270-S amongst multiple speech recognition models 270.

In step 1020, the speech recognition system 140 applies the selected speech recognition model 270-S to the utterance 105 to identify an end location 230-2 of the segment of utterance 120 including the at least one yet to be recognized word.

FIG. 11 is a flowchart 1100 illustrating a method of implementing speech recognition according to embodiments herein.

In step 1115, the speech recognition system 140 utilizes at least one detected word in the utterance 105 to identify a class type of the segment of utterance 120 including at least one yet to be recognized word.

In step 1120, the speech recognition system 140 utilizes the at least one detected word in the utterance 105 to identify a start location 230-1 of the segment of utterance 120.

In step 1125, the speech recognition system 140 utilizes the identified class type to select a speech recognition model 270-S amongst multiple speech recognition models 270.

In step 1130, the speech recognition system 140 applies the selected speech recognition model 270-S to the segment of utterance 120 to identify an end location 230-2 of the segment of utterance 120.

In step 1135, the speech recognition system 140 analyzes sub-word units in the segment of utterance 120 following the start location 230-1 by comparing a sequence of the sub-word units in the segment of utterance 120 to common word endings of a type as specified by the class type and selected model 270-S.

In step 1140, the speech recognition system 140 detects that the sequence of sub-word units matches a common word ending of the type as specified by the class type and selected model 270-S.

In step 1150, based on the matching, the speech recognition system 140 marks an ending of the sequence of sub-word units in the utterance 105 as the end location 230-2 of the segment of utterance 120.

FIG. 12 is a diagram illustrating another example of processing a received utterance 105 according to embodiments herein. In this example, the first pass analyzer 110-1 is unable to translate the first portion of utterance 105 into respective detected words. However, first pass analyzer 110-1 translates a latter portion of utterance 105 into multiple words. In a manner as previously discussed, the speech recognition system 140 utilizes the grouping of words as detected by the first pass analyzer 110-1 to identify a respective slot (e.g., segment of utterance 120) located at a beginning of the utterance 105. The one or more words following the slot including segment of utterance 120 can indicate the type of data to be found in the slot. Second pass analyzer 110-2 then processes segment of utterance 120 to recognize additional words as shown.

As an example, the utterance 105 may include a sequence of words such as "Burlington is my destination." In this instance, there are no words preceding the destination "Burlington."

Thus, there can be any number of zero or more words preceding or following a given slot in utterance 105. The speech recognition system 140 can also learn that a slot can be directly at the end or beginning of a sentence. In one embodiment, the language model does so by considering a sentence start symbol and a sentence end symbol for the n-gram modeling of the statistical language model. So the statistical language model's bi-grams that would match the second utterance would be: start symbol—<location>, <location>—is, is—my, my—destination, destination—end symbol.

FIG. 13 is a diagram illustrating example processing of a received utterance according to embodiments herein. As shown, the first pass analyzer 110-1 may not be able to convert all of the utterance 105 into respective words. In such an embodiment, there is no need to apply the second pass analyzer 110-2 as there are no undetected words left.

As an example, a speaker may speak the phrase "I want to go to" without speaking a destination as the last portion may be cut off for some reason. In such an instance, the speech recognition system 140 identifies that the utterance 105 doesn't contain a slot, or as an alternative, the speech recognition system 140 can interpret that there is a slot but that the slot after "go to" is empty.

FIG. 14 is a diagram illustrating example processing of a received utterance according to embodiments herein. As shown, the first pass analyzer 110-1 may not be able to convert any words in the utterance 105 on the first pass. The second pass analyzer 110-2 processes the segment of utterance 120 (which is assumed to be the whole utterance 105 in this case) to translate the segment of utterance 120 into one or more words.

As an example, the utterance 105 may include a spoken phrase such as "Burlington." In this example, the speech recognition system 140 identifies a start symbol—<location>, <location> end symbol and applies the second pass analyzer 110-2 to convert the spoken phrase "Burlington" into respective text. Note again that techniques herein are well suited for use in speech recognition systems. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A method comprising:
   performing, by computer processing hardware, operations of:
   based on analyzing at least a portion of an utterance using a first speech recognition model, detecting that the utterance includes a first group of at least one spoken word;
   utilizing the first group of at least one spoken word in the utterance to locate a given segment in the utterance including at least one word that is unrecognizable by the first speech recognition model;
   based on analyzing the given segment via application of a second speech recognition model, detecting a second group of at least one spoken word in the utterance; and
   wherein utilizing the first group of at least one spoken word in the utterance to locate the given segment in the utterance includes: analyzing the first group of at least one spoken word to identify a start location of the given segment.

2. The method as in claim 1 further comprising:
   analyzing the first group of at least one spoken word to identify a class type associated with the first group, the second speech recognition model configured to recognize a class of different words as specified by the identified class type; and
   wherein analyzing the given segment using the second speech recognition model comprises: utilizing the class type to select the second speech recognition model amongst multiple speech recognition models.

3. The method as in claim 1 further comprising:
   extracting the second group of at least one spoken word from the given segment in the utterance.

4. The method as in claim 1 further comprising:
   implementing multi-pass speech recognition on the utterance:
   during a first pass of the multi-pass speech recognition, applying the first speech recognition model to the utterance; and
   during a second pass of the multi-pass speech recognition following the first pass, applying the second speech recognition model to the given segment in the utterance.

5. The method as in claim 1, wherein utilizing the first group of at least one spoken word in the utterance to locate a given segment includes:
   utilizing the first group of at least one spoken word to identify a class type of at least one unrecognized word in the given segment;
   utilizing the identified class type to select an end-of-segment analyzer model; and
   applying the selected end-of-segment analyzer model to sub-word units in the given segment following the start location in the utterance to identify an end location of the given segment.

6. The method as in claim 1, wherein analyzing at least a portion of the utterance using the first speech recognition model includes applying a statistical language model to the utterance to detect the first group of at least one spoken word; and
   wherein analyzing the given segment using a second speech recognition model comprises applying a grammar recognition model to the given segment.

7. The method as in claim 1 further comprising:
   converting the utterance into a command used to control an electronic device.

8. A method comprising:
   performing, by computer processing hardware, operations of:
   based on analyzing at least a portion of an utterance using a first speech recognition model, detecting that the utterance includes a first group of at least one spoken word;
   utilizing the first group of at least one spoken word in the utterance to locate a given segment in the utterance including at least one word that is recognizable by the first speech recognition model;
   based on analyzing the given segment via application of a second speech recognition model, detecting a second group of at least one spoken word in the utterance;
   receiving notification that the utterance includes the first group of at least one spoken word and the second group of at least one spoken word; and
   via application of a natural language understanding model, analyzing a combination of the first group of at least one spoken word and the second group of at least one spoken word to identify a command intended by the utterance.

9. A method comprising:
   performing, by computer processing hardware, operations of:
   first speech recognition model, detecting that the utterance includes a first group of at least one spoken word;
   utilizing the first group of at least one spoken word in the utterance to locate a given segment in the utterance including at least one word that is unrecognizable by the first speech recognition model;

based on analyzing the given segment via application of a second speech recognition model, detecting a second group of at least one spoken word in the utterance;

assigning a respective speech recognition model to each respective word sequence of multiple possible word sequences, each respective speech recognition model configured to analyze and recognize words of a particular type that typically follow the respective word sequence; and matching the first group of at least one spoken word in the utterance with a specific word sequence of the multiple possible word sequences, the specific word sequence being assigned the second speech recognition model to identify the words of the particular type that typically follow the specific word sequence.

10. A computer system comprising:

a processor;

a memory unit that stores instructions associated with an application executed by the processor; and an interconnect coupling the processor and the memory unit, enabling the computer system to execute the application and perform operations of:

based on analyzing at least a portion of an utterance using a first speech recognition model, detecting that the utterance includes a first group of at least one spoken word;

utilizing the first group of at least one spoken word in the utterance to locate a given segment in the utterance including at least one word that is unrecognizable by the first speech recognition model;

based on analyzing the given segment via application of a second speech recognition model, detecting a second group of at least one spoken word in the utterance;

wherein utilizing the first croup of at least one spoken word in the utterance to locate the given segment in the utterance includes: analyzing the first group of at least one spoken word to identify a start location of the given segment.

11. A method comprising:

performing, by computer processing hardware, operations of:

utilizing at least one detected word in an utterance to identify a class type of a given segment of the utterance including at least one yet to be recognized word;

utilizing the identified class type to select a speech recognition model amongst multiple speech recognition models; and applying the selected speech recognition model to the utterance to identify an end location of the given segment including the at least one yet to be recognized word.

12. The method as in claim 11 further comprising:

utilizing the at least one detected word in the utterance to identify a start location of the given segment.

13. The method as in claim 12, wherein applying the selected speech recognition model to the given segment in the utterance to identify the end location:

analyzing sub-word units in the given segment following the start location to match a sequence of the sub-word units in the utterance to common word endings of a type as specified by the class type.

14. The method as in claim 13 further comprising:

detecting that the sequence of the sub-word units matches a common word ending of the type as specified by the class type; and marking an ending of the sequence of sub-word units as the end location of the given segment.

15. The method as in claim 11 further comprising:

assigning a respective class type to each respective word sequence of multiple possible word sequences, the respective class type indicative of a type of word that typically follows the respective word sequence; and wherein utilizing the at least one detected word to identify the class type comprises: matching the at least one detected word in the utterance with a specific word sequence of multiple possible word sequences, the specific word sequence being assigned the identified class type.

16. Computer-readable storage hardware having instructions stored thereon for processing data information, such that the instructions, when carried out by a processing device, cause the processing device to perform operations of:

based on analyzing at least a portion of an utterance using a first speech recognition model, detecting that the utterance includes a first group of at least one spoken word;

utilizing the first group of at least one spoken word in the utterance to locate a given segment in the utterance including at least one word that is unrecognizable by the first speech recognition model;

based on analyzing the given segment via application of a second speech recognition model, detecting a second group of at least one spoken word in the utterance;

assigning a respective speech recognition model to each respective word sequence of multiple possible word sequences, each respective speech recognition model configured to analyze and recognize words of a particular type that typically follow the respective word sequence; and matching the first group of at least one spoken word in the utterance with a specific word sequence of the multiple possible word sequences, the specific word sequence being assigned the second speech recognition model to identify the words of the particular type that typically follow the specific word sequence.

17. The computer-readable storage hardware as in claim 16 further including instructions stored thereon that causes the processing device to perform operations of:

analyzing the first group of at least one spoken word to identify a class type associated with the first group, the second speech recognition model configured to recognize a class of different words as specified by the identified class type; and wherein analyzing the given segment using the second speech recognition model comprises: utilizing the class type to select the second speech recognition model amongst multiple speech recognition models.

18. The computer-readable storage hardware as in claim 16, wherein analyzing at least a portion of the utterance using the first speech recognition model includes applying a statistical language model to the utterance to detect the first group of at least one spoken word; and wherein analyzing the given segment using a second speech recognition model comprises applying a grammar recognition model to the given segment.

19. The computer-readable storage hardware as in claim 16 further including instructions stored thereon that causes the processing device to perform operations of:

converting the utterance into a command used to control an electronic device.

20. The computer-readable storage hardware as in claim 16 further including instructions stored thereon that causes the processing device to perform operations of:

implementing multi-pass speech recognition on the utterance:
  during a first pass of the multi-pass speech recognition, applying the first speech recognition model to the utterance; and
  during a second pass of the multi-pass speech recognition following the first pass, applying the second speech recognition model to the given segment in the utterance.

21. Computer-readable storage hardware having instructions stored thereon for processing data information, such that the instructions, when carried out by a processing device, cause the processing device to perform operations of:
  based on analyzing at least a portion of an utterance using a first speech recognition model, detecting that the utterance includes a first group of at least one spoken word;
  utilizing the first group of at least one spoken word in the utterance to locate a given segment in the utterance including at least one word that is unrecognizable by the first speech recognition model;
  based on analyzing the given segment via application of a second speech recognition model, detecting a second group of at least one spoken word in the utterance;
  receiving notification that the utterance includes the first group of at least one spoken word and the second group of at least one spoken word; and
  via application of a natural language understanding model, analyzing a combination of the first group of at least one spoken word and the second group of at least one spoken word to identify a command intended by the utterance.

22. Computer-readable storage hardware having instructions stored thereon for processing data information, such that the instructions, when carried out by a processing device, cause the processing device to perform operations of:
  based on analyzing at least a portion of an utterance using a first speech recognition model, detecting that the utterance includes a first group of at least one spoken word;
  utilizing the first group of at least one spoken word in the utterance to locate a given segment in the utterance including at least one word that is unrecognizable by the first speech recognition model;
  based on analyzing the given segment via application of a second speech recognition model, detecting a second group of at least one spoken word in the utterance; and
  analyzing the first group of at least one spoken word to identify a start location of the given segment.

23. The computer-readable storage hardware as in claim 22, wherein utilizing the first group of at least one spoken word in the utterance to locate a given segment includes:
  utilizing the first group of at least one spoken word to identify a class type of at least one unrecognized word in the given segment;
  utilizing the identified class type to select an end-of-segment analyzer model; and
  applying the selected end-of-segment analyzer to sub-word units in the given segment following the start location in the utterance to identify an end location of the given segment.

24. Computer-readable storage hardware having instructions stored thereon for processing data information, such that the instructions, when carried out by a processing device, cause the processing device to perform operations of:
  based on analyzing at least a portion of an utterance using a first speech recognition model, detecting that the utterance includes a first group of at least one spoken word;
  utilizing the first group of at least one spoken word in the utterance to locate a given segment in the utterance including at least one word that is unrecognizable by the first speech recognition model;
  based on analyzing the given segment via application of a second speech recognition model, detecting a second group of at least one spoken word in the utterance;
  assigning a respective speech recognition model to each respective word sequence of multiple possible word sequences, each respective speech recognition model configured to analyze and recognize words of a particular type that typically follow the respective word sequence; and
  matching the first group of at least one spoken word in the utterance with a specific word sequence of the multiple possible word sequences, the specific word sequence being assigned the second speech recognition model to identify the words of the particular type that typically follow the specific word sequence.

* * * * *